(12) United States Patent
Yoshida (10) Patent No.: US 8,744,225 B2
(45) Date of Patent: Jun. 3, 2014

(54) OPTICAL COUPLING DEVICE AND OPTICAL COUPLING-BRANCHING DEVICE

(75) Inventor: Haruhiko Yoshida, Funabashi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 112 days.

(21) Appl. No.: 13/425,850

(22) Filed: Mar. 21, 2012

(65) Prior Publication Data

US 2012/0230635 A1 Sep. 13, 2012

Related U.S. Application Data

(63) Continuation of application No. PCT/JP2009/066830, filed on Sep. 28, 2009.

(51) Int. Cl.
*G02B 6/26* (2006.01)

(52) U.S. Cl.
USPC .............................................. 385/43; 385/50

(58) Field of Classification Search
USPC ...................................................... 385/43, 50
See application file for complete search history.

(56) References Cited

U.S. PATENT DOCUMENTS

| | | | |
|---|---|---|---|
| 5,818,989 A | 10/1998 | Nakamura | |
| 5,923,801 A | 7/1999 | Frank et al. | |
| 6,269,211 B1 | 7/2001 | Hatayama et al. | |
| 7,899,286 B2 | 3/2011 | Yoshida et al. | |
| 8,068,704 B2 | 11/2011 | Hashimoto et al. | |

FOREIGN PATENT DOCUMENTS

| | | |
|---|---|---|
| JP | 05-142435 | 6/1993 |
| JP | 09-265018 | 10/1997 |
| JP | 10-078517 | 3/1998 |
| JP | 2000-180646 A | 6/2000 |
| JP | 2000-258648 | 9/2000 |
| JP | 2004-138785 | 5/2004 |
| JP | 2005-538426 A | 12/2005 |
| JP | 2008-261952 | 10/2008 |
| JP | 2009-36873 | 2/2009 |

OTHER PUBLICATIONS

International Search Report issued on Oct. 20, 2009 for PCT/JP2009/066830 filed on Sep. 28, 2009 with English Translation.
International Written Opinion issued on Oct. 20, 2009 for PCT/JP2009/066830 filed on Sep. 28, 2009.
Office Action issued on Jan. 8, 2013, in Japanese patent Application No. 2011-532891 with English translation.
International Preliminary Report on Patentability issued Apr. 19, 2012 in PCT/JP2009/066830 filed Sep. 28, 2009.
Written Opinion issued Oct. 20, 2009 in PCT/JP2009/066830 filed Sep. 28, 2009 submitting English language translation only.

*Primary Examiner* — Jerry Rahll
(74) *Attorney, Agent, or Firm* — Oblon, Spivak, McClelland, Maier & Neustadt, L.L.P.

(57) ABSTRACT

In an optical coupling device, a main waveguide have a linearly extending portion and a tapered portion formed on a first clad layer. The waveguide has a width which is gradually reduced towards an incident side of the light wave. Auxiliary waveguides are formed on the both sides of the main waveguide, wherein each of the auxiliary waveguides has first and second tapered portions having widths which are gradually reduced toward both sides. A second clad layer is so formed as to cover the main and auxiliary waveguides and first clad layer, wherein the first clad layer guides the light wave introduced into the first clad layer or the second clad layer and gradually converge the light wave towards the main waveguide.

11 Claims, 7 Drawing Sheets

OPTICAL COUPLING DEVICE AND OPTICAL COUPLING-BRANCHING DEVICE

CROSS-REFERENCE TO RELATED APPLICATIONS

This application is a Continuation Application of PCT Application No. PCT/JP2009/066830, filed Sep. 28, 2009, the entire contents of which are incorporated herein by reference.

FIELD

Embodiments described herein relate generally to an optical coupling device that couples an optical signal propagating through an optical fiber or space to an optical waveguide device and an optical coupling-branching device that combines a plurality of optical signals into one optical signal or branches one optical signal into a plurality of optical signals.

BACKGROUND

Conventionally, a digital optical transmission technology is actively studied and developed and the technology of an optical communication network ranging to a trunk line series, a metro line series, an access series and so on is rapidly developed and becomes a familiar technology with the spread of FTTH. Recently, it is further strongly required to achieve high-speed signal transmission between boards of digital devices or computers. The optical transmission and interconnection technology (optical wiring technology) is also progressively put into practice. Further, the technology of optical interconnections that replaces wiring interconnections between chips or in chips is developed and is vigorously studied, which is expected to overcome a problem of a wiring interconnection bottleneck of an integrated circuit. This is because the optical signal transmission is excellent in the transmission speed and interference between signals and the like in comparison with the electrical signal transmission. A reduction in power consumption and miniaturization of an optical circuit, an optical module or an optical device which is utilized for an optical transmission or an optical interconnection is required with the background of a rapid increase in the recent communication traffics and a rapid increase in the necessity of interconnections that make use of high speed of light from between boards into a board or from between chips into a chip.

In the field of optical interconnection technology, there is developed a study of silicon-photonics in which a matured process technology in a silicon LSI can be utilized. Accordingly, a waveguide having a low loss even in an abruptly bent portion that is extremely minute (for example, the cross section is 500 nanometer square or less) can be realized by making use of a difference in a high refractive index between silicon and silicon oxide or air. Thus, it is possible to achieve a reduction in power consumption and miniaturization of a transmission and reception system or module for optical communication, and it is also possible to realize an introduction and integration of an optical interconnection into a silicon LSI. As the device for the optical interconnection, a miniaturized and highly-efficient optical coupling-branching device for optical coupling and optical branching in an optical device or between optical devices including an optical waveguide becomes an extremely important development factor together with an active device for light transmission, light modulation, light reception.

Particularly, in the optical coupling device, as expected, a spot-size converter that can be easily formed with a high reduction ratio (one to two digits or more) and high efficiency becomes a key device for practical use. Conventionally, as a spot-size converter that performs optical coupling with high efficiency, a method for combining an inverted taper structure of a silicon fine line with a clad for optical confinement is widely used since formation and integration become relatively easy by utilizing the feature of silicon suitable for a miniaturization process as disclosed in JP-A 2009-36873 (KOKAI).

However, for coupling with high efficiency, it is necessary to form a long (several hundred μm) taper whose head width is several ten nm or less. In this structure, since miniaturization patterning by electron beam (EB) lithography is required, a problem that it is not suitable for mass production occurs. Further, the taper length becomes extremely long to perform heat-insulating mode conversion and integration with high density becomes difficult and an important problem occurs particularly when it is applied to an optical interconnection on a small LSI chip.

Further, on the other hand, an optical coupling-branching device that efficiently distributes light to a plurality of waveguides becomes a key device for a highly efficient operation of a device having optical branches in an internal portion such as an optical interferometer which is used in an optical modulator or the like. The optical coupling-branching device is also important for high efficiency of optical coupling and branching required for a parallel process and multiplexing of signal processes. To realize this high efficient operation, there are often used (1) continuous branch waveguides and (2) an optical coupling-branching device utilizing multi-mode interference.

As described above, there is known a convention optical coupling device that reduces or enlarges a light beam with a high reduction ratio or high enlargement ratio for an optical interconnection on an LSI chip and couples the light beam with high efficiency. The convention optical coupling device has a problem that practical use and mass-production are difficult, since a high-degree miniaturization processing technology that is not suitable for mass production is required and the device length becomes extremely long.

Particularly, when a circuit is formed on the LSI chip by means of an optical interconnection, the optical waveguide or waveguides are crossed on or upon the other waveguide or waveguides so that the intersection between optical waveguides inevitably occurs. Thus, it is required to propose a method for reducing a loss or crosstalk at the intersection. Some methods for solving this problem are proposed, for example, (1) a method for devising the shape of an intersecting portion to prevent the mode shape of propagation light in the intersecting portion from being overlapped between the waveguides as far as possible by directly intersecting them, (2) a method for propagating one portion in the waveguide in the intersecting portion and propagating the other portion outside the waveguide (clad layer), and (3) a method for making an interconnection to cause the intersection to occur only between different layers by multi-laying the optical interconnections and the like. Among the above proposals, the method for multi-laying the optical interconnections to directly avoid the intersection is understood as a unique method that can completely eliminate a loss or crosstalk in the intersecting portion.

However, in the multi-layered interconnection structure, a waveguide that connects different layers or an optical coupling device that connects waveguides becomes necessary. Among them, in order to form a waveguide that connects the layers, a high-degree 3-dimensional process and 3-dimensional interconnection technology for forming a 3-dimensionally bent waveguide are required and it is understood difficult to realize the same. In comparison with this, it is extremely easy to couple the optical waveguides arranged on different layers via an optical coupling device that controls the height of light propagation. As a method for realizing this, a method for processing the head portions of two waveguides arranged on different layers into inverted taper forms and setting them to face each other to switch the layer used for propagating light is proposed in JP-A 2008-261952 (KO-KAI). However, since the method requires extremely long taper length (several hundred micron to one millimeter or more) to highly efficient coupling of the inverted tapers although it is high performance, it is understood difficult to be applied to an optical interconnection with high density on the chip.

Further, it is pointed out that the following problem occurs in an optical coupling-branching device.

In the branch waveguide of (1), particularly, in a silicon fine-line waveguide (i.e., a waveguide having a small diameter) of a single mode, in order to reduce a loss due to reflection or scattering in the branching portion, it is required to finely control the shape (curvature, thickness, offset and the like) and a highly precise miniaturization processing technology is required. Further, in the optical coupling-branching device of (2), since interference is used, it is also necessary to perform a highly precise miniaturization process for the shape or the like of the coupling portion with the waveguide and the width and length of the device and it is understood difficult to realize an optical coupling-branching device that can be easily formed. Further, since 3-dimensionally branching light between the optical interconnection layers arranged on the multiple layers in either structure requires a complicated 3-dimensional device structure, it is understood difficult to realize the same.

Thus, conventionally, it is understood difficult to realize the optical coupling-branching device that can be easily formed and distributes light by 3-dimensionally branching the same between different optical interconnection layers and combines the same.

DETAILED DESCRIPTION

There will now be explained in detail an optical coupling device and optical coupling-branching device according to embodiments with reference to the drawings.

According to an embodiment, there is provided an optical coupling device comprises: a first clad layer having a first surface; a main waveguide having a strip form and including a linearly extending portion and a tapered portion, which is so formed on the first surface as to be extended along a wave-guiding direction of the light wave, wherein the linearly extending portion has an emission port at one end of an emission side from which a light wave is emitted, and the tapered portion has one and other ends, the one end being connected to the other end of the linearly extending portion, the tapered portion has a width which is gradually reduced towards the other end corresponding to an incident side of the light wave; a plurality of auxiliary waveguides which are formed on the first surface to extend along the wave-guiding direction of the light wave and are arranged in substantially parallel on the both sides of the main waveguide, wherein each of the auxiliary waveguides has first and second tapered portions which are coupled to each other at a coupling side, and the auxiliary waveguides have widths which are gradually reduced towards the incident side of light wave and the emission side of light wave, from the coupling side, respectively; and a second clad layer which is so formed as to cover the main waveguide, auxiliary waveguides and first clad layer, wherein the first clad layer guides the light wave introduced into the first clad layer or the second clad layer and gradually converge the light wave towards the main waveguide.

According to another embodiment, there is provided an optical coupling-branching device comprising: a first clad layer having a first surface, a first waveguide extending on the first surface along a wave-guiding direction of a light wave from a light wave incident side towards a light wave emission side and including a first tapered portion that has a first head portion, the first waveguide having the first tapered portion whose lateral width is gradually reduced towards the emission side; second and third waveguides arranged in parallel, extending on the first surface along the wave-guiding direction of the light wave and including second and third tapered portions, the second and third tapered portions having second and third head portions, the second and third waveguides having the second and third tapered portions whose lateral widths are gradually reduced towards the incident side, and the second and third head portions being separately arranged with a distance and the first head portion being directed towards a portion between the second and third head portions; and a second clad layer which is so formed as to cover the first, second and third waveguides and the first surface, the second clad layer coupling the light wave wave-guided to the first waveguide from the incident side to the second and third waveguides to branch the same to the second and third waveguides.

According to still another embodiment, there is provided an optical coupling-branching device comprising: a first clad layer having a first surface; a first waveguide extending on the first surface along a wave-guiding direction of a light wave from an emission side of the light wave towards an incident side of the light wave and including a first tapered portion that has a first head portion, the first waveguide including the first tapered portion whose lateral width is gradually reduced towards the incident side; second and third waveguides arranged in parallel, extending on the first surface along the wave-guiding direction of the light wave and including second and third tapered portions that have second and third head portions, the second and third waveguides including the second and third tapered portions whose lateral widths are gradually reduced towards the emission side and that have the second and third head portions separately arranged with a distance and the first head portion being directed to a portion between the second and third head portions; and a second clad layer formed to cover the first, second and third waveguides and the first surface, the second clad layer coupling light waves wave-guided to the second and third waveguides from the incident side to the first waveguide to couple the same to the first waveguide.

The optical coupling device and the optical coupling-branching device described above can reduce or reduce a light beam with a high reduction ratio or high enlargement ratio and couple the electron beam with high efficiency, can be made small, can be easily formed and are suitable for mass production.

An optical coupling device according to a first embodiment will be described with reference to FIG. 1 and FIG. 2.

Figure 1:
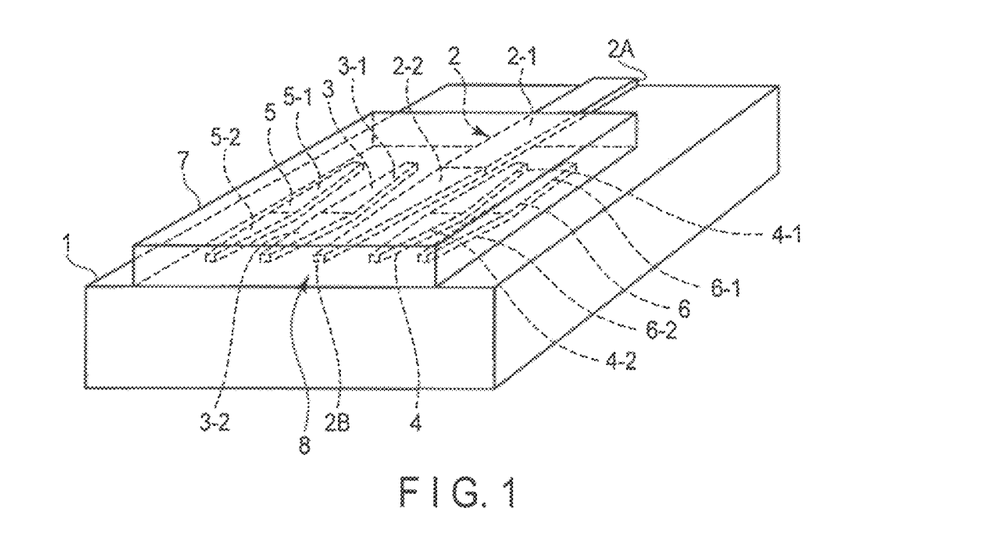
FIG. 1 is a perspective view showing a device structure of an optical coupling device according to a first embodiment.
Figure 2:
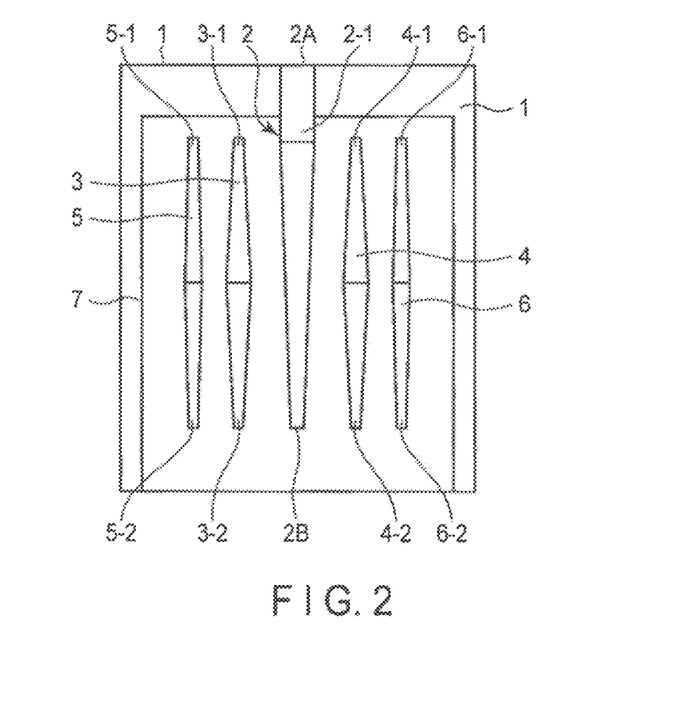
FIG. 2 is a plan view schematically showing the device structure of the optical coupling device shown in FIG. 1.

FIG. 1 shows the structure of an optical coupling device according to a first embodiment and FIG. 2 shows the plane arrangement of the optical coupling device shown in FIG. 1. A substrate 1 shown in FIG. 1 and FIG. 2 has a substrate structure in which silicon dioxide (BOX layer) is formed as a lower clad layer on an SOI substrate. The substrate 1 has a flat main surface and a main waveguide 2 and first to fourth auxiliary waveguides 3, 4, 5, 6 are formed in parallel as core layers on the flat surface. The main waveguide 2 is lined up at one end with the side surface of the substrate 1 and includes a light emission port 2An optically connected to another optical component, for example, an optical fiber. The main waveguide 2 includes a linear portion 2-1 formed in a flat strip form or pattern and linearly extending towards the side of a light introduction region 8 of the optical coupling device and a tapered portion 2-2 that is connected to the linear portion and whose width is gradually reduced along an extending direction. An end face 2B of the tapered portion 2-2 is set to face the light introduction region 8. The first to fourth auxiliary waveguides 3, 4, 5, 6 are formed to have narrower width than the main waveguide 2 to set the maximum width of the first to fourth auxiliary waveguides 3, 4, 5, 6 to width that is smaller than the maximum width of the tapered portion 2-2 of the main waveguide 2. Further, the maximum widths of the first and second auxiliary waveguides 3, 4 are set to width larger than the maximum widths of the third and fourth auxiliary waveguides 5, 6. The first to fourth auxiliary waveguides 3, 4, 5, 6 are arranged in a direction departing from the main waveguide 2 and formed to have narrower width as the separation distance becomes longer.

The main waveguide 2 divides a surface region of the main surface into one and other regions as shown in FIG. 2. The first and third auxiliary waveguides 3, 5 are formed on the one region divided by the main waveguide 2 on the main surface and the second and fourth auxiliary waveguides 4, 6 are formed on the other region divided by the main waveguide 2 on the main surface. The first to fourth auxiliary waveguides 3, 4, 5, 6 have substantially the equal total length and arranged to extend in an extending direction of the main waveguide 2. Further, the first to fourth auxiliary waveguides 3, 4, 5, 6 respectively include first tapered portions 3-1, 4-1, 5-1, 6-1 whose widths are gradually reduced along the linear portion 2-1 of the main waveguide 2 and second tapered portions 3-2, 4-2, 5-2, 6-2 whose widths are gradually reduced along the tapered portion 2-2 of the main waveguide 2. The first tapered portions have end faces set towards the light emission port 2A side and the second tapered portions 3-2, 4-2, 5-2, 6-2 also have end faces set towards the light introduction region 8 side. In this case, the first and second auxiliary waveguides 3, 4 are formed with the same shape and arranged on the main surface of the substrate 1 in line symmetry around the central-axis line of the main waveguide 2. Also, the third and fourth auxiliary waveguides 5, 6 are formed with the same shape and arranged on the main surface of the substrate 1 in line symmetry around the central-axis line of the main waveguide 2. Then, the main surface of the substrate 1 on which the auxiliary waveguides 3, 4, 5, 6 and main waveguide 2 are formed is covered with an upper clad layer 7.

In the structure shown in FIG. 1 and FIG. 2, an example is shown, in which the four auxiliary waveguides 3, 4, 5, 6 are provided, but two auxiliary waveguides 3, 4 may be provided or four or more auxiliary waveguides may be provided. Further, in the structure shown in FIG. 1 and FIG. 2, the refractive index $2n$ of the main waveguide 2 is set approximately equal to the refractive index $3n$ of the auxiliary waveguides 3, 4, 5, 6 and the refractive index $1n$ of the lower clad layer formed of silicon dioxide (BOX layer) of the substrate 1 is set approximately equal to or smaller than the refractive index $7n$ of the upper clad layer 7. ($1n=7n$ or $1n<7n$) Further, the refractive index $2n$ of the main waveguide 2 and the refractive index $3n$ of the auxiliary waveguides 3, 4, 5, 6 are set larger than the refractive index $1n$ of the lower clad layer and the refractive index $7n$ of the upper clad layer 7. ($2n, 3n>1n, 7n$)

In the optical coupling device shown in FIG. 1 and FIG. 2, a light wave of a light beam is made incident in the upper clad layer 7 from the light introduction region 8 side of the side surface of the upper clad layer 7 to be set to face the end face 2B of the tapered portion 2-2 as explained later and if it propagates therein, it is introduced from the end face 2B of the tapered portion 2-2 and the end faces of the tapered portions 3-2, 4-2, 5-2, 6-2 into the tapered portion 2-2 and the tapered portions 3-2, 4-2, 5-2, 6-2. Then, the light waves travel in the tapered portion 2-2 and the tapered portions 3-2, 4-2, 5-2, 6-2 to increase the light intensity distribution in the tapered portion 2-2 and the tapered portions 3-2, 4-2, 5-2, 6-2 at the time of propagation of the light wave and the light wave is unevenly distributed to gradually increase the light intensity distribution towards the tapered portion 2-2. If light waves are introduced into the linear portion 2-1 and tapered portion 2-2 and linear portion 2-1, the light waves are more unevenly distributed in the linear portion 2-1 and the light wave is concentrated in the linear portion 2-1 and emitted from the light emission port 2A with a reduction in the widths of the tapered portions 3-2, 4-2, 5-2, 6-2.

The structure shown in FIG. 1 and FIG. 2 is basically manufactured as follows. That is, first, a BOX layer is formed on an SOI substrate to form a substrate 1 and a thin silicon layer is formed on the BOX layer of the substrate 1. A pattern of an array of the silicon fine-line waveguides with inverted tapers is transferred on the thin silicon layer by utilizing an optical lithography and dry-etched to form auxiliary waveguides 3, 4, 5, 6 and main waveguide 2. After this process, an upper clad 7 formed of polyimide or nitrogen oxide silicon (SiON) is formed by deposition by spin coating or thermal CVD around the array of silicon fine-line waveguides and the structure shown in FIG. 1 and FIG. 2 is manufactured.

Figure 3A:
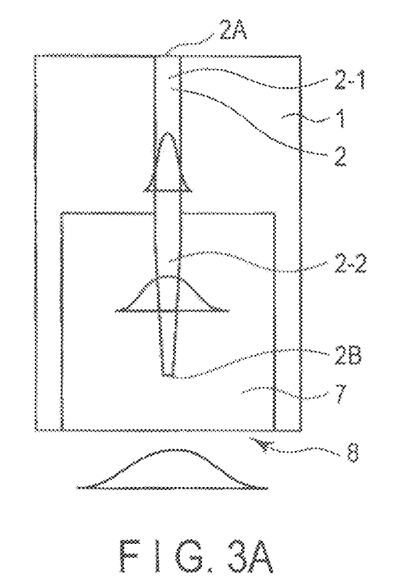
FIG. 3A is a plan view schematically showing a single tapered optical coupling device according to a comparison example.
Figure 3B:
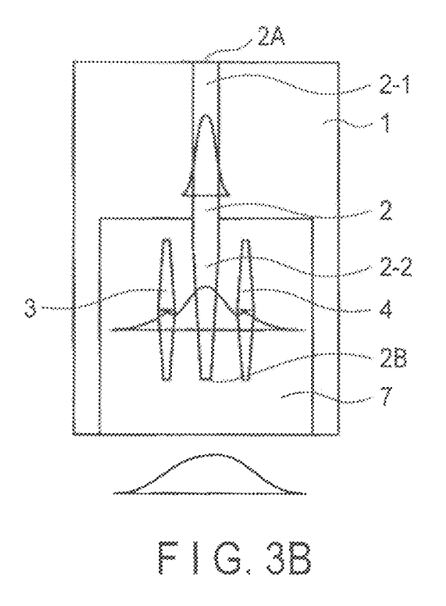
FIG. 3B is a plan view schematically showing the structure of an optical coupling device according to a second embodiment.
Figure 3C:
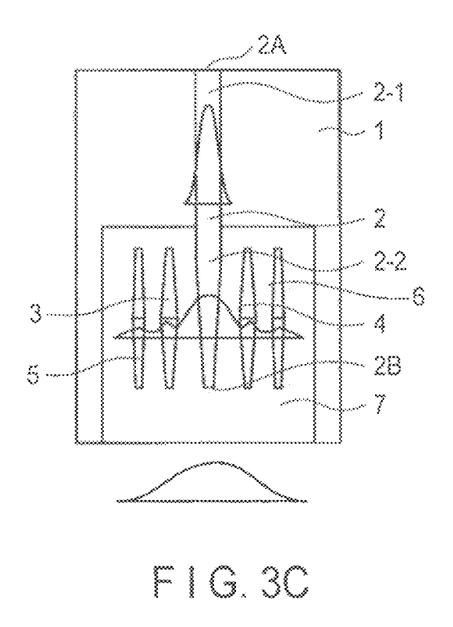
FIG. 3C is a plan view schematically showing the structure of the optical coupling device shown in FIG. 1 and FIG. 2.

In FIG. 3A, an optical coupling device having only a main waveguide 2 formed on the flat main surface of the substrate 1 is shown as a comparison example. Since the optical coupling device is different only in that first to fourth auxiliary waveguides 3, 4, 5, 6 are not formed, portions are denoted by the same symbols attached in FIG. 1 and FIG. 2 and the explanation thereof is omitted. Further, in FIG. 3B, an optical coupling device according to another embodiment is shown. The optical coupling device shown in FIG. 3B is different from the optical coupling device shown in FIG. 1 and FIG. 2 in that first and second auxiliary waveguides 3, 4 are formed on both sides of the main waveguide 2 and third and fourth auxiliary waveguides 5, 6 are not formed. Therefore, in FIG. 3B, portions are denoted by the same symbols as those attached in FIG. 1 and FIG. 2 and the explanation thereof is omitted. FIG. 3C shows the optical coupling device shown in FIG. 1 and FIG. 2.

In the waveguide 2 having the single inverted taper 2-2 as shown in FIG. 3A, the diameter of a light beam that can be coupled to the inverted taper 2-2 becomes smaller as the width of the head portion 2B becomes larger and the optical coupling efficiency is lowered. For example, when an input light wave with the beam diameter of 3 micron is coupled to the silicon waveguide 2 having the width of 450 nm and the height of 250 nm, the optical coupling efficiency of 80% or more can be attained in the case of the head width of 100 nm or less but the optical coupling efficiency is lowered to 50% or less if the head width becomes 200 nm or more. Therefore, in the structure shown in FIG. 3A, the resolution becomes insufficient in the optical lithography by means of a stepper suitable for mass production and a high-degree miniaturization processing technology such as EB lithography that is not suitable for mass production is required.

In order to solve the above problem, auxiliary waveguides 3, 4 having short tapers 3-2, 4-2 separated with a distance that permits light waves to be coupled, that is, a distance of 500 nm or less are arranged on both sides of the inverted taper 2-2 that are input/output portions of the main waveguide 2 for the optical interconnection as shown in FIG. 3B or FIG. 3C. With the above structure, a portion of the light wave that was not coupled with the main waveguide 2 can be coupled with the auxiliary waveguides 3, 4. Further, large portions of the light waves that are coupled with the auxiliary waveguides 3, 4 can be coupled with the main waveguide 2 by adequately designing the widths of the auxiliary waveguides 3, 4. At this time, in order to couple and shift the light waves from the auxiliary waveguides 3, 4 to the main waveguide 2, it is necessary to set the widths of the auxiliary waveguides 3, 4 smaller than at least that of the main waveguide 2 and it is necessary to process the output end sides of the auxiliary waveguides 3, 4 into a taper form having a narrow head like the input end sides. Further, the coupling efficiency can be further increased by converting the structure having the two auxiliary waveguides 3, 4 (one on each of the right and left sides) as shown in FIG. 3B to the structure in which the number of auxiliary waveguides 3, 4 is increased and that has the four auxiliary waveguides 3, 4 (two on each of the right and left sides) as shown in FIG. 3C. For example, when the head width of the inversed taper is 200 nm and the taper length is 150 μm, the coupling efficiency of 50% (loss 3 dB) was obtained in the case of a single taper, but it can be improved to 70% (loss 1.5 dB) in the case of the two auxiliary waveguides 3, 4 and 80% (loss 1 dB) in the case of the four auxiliary waveguides 3, 4, 5, 6. Further, when comparison is made with the same performance (coupling efficiency) as that of the single tapered spot-size converter shown in FIG. 3A, the device length can be significantly reduced in the structure. For example, the coupling efficiency of 80% or more can be obtained in the case of the four auxiliary waveguides 3, 4, 5, 6 with the head width of 150 nm and the taper length of 50 μm and can be significantly reduced in comparison with the taper length (200 to 300 μm even if the head width is 100 nm or less) required for the conventional single tapered spot-size converter having substantially the same performance.

Figure 4:
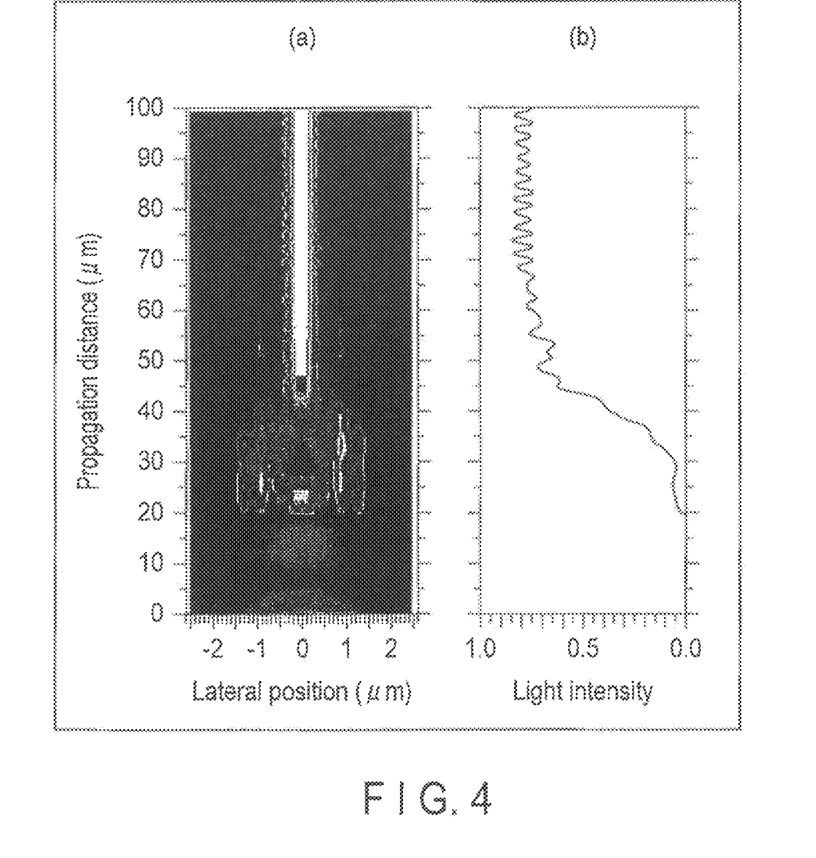
FIG. 4 is a schematic view and graph showing the state of optical coupling and propagation in the optical coupling device shown in FIG. 1 and FIG. 2 by simulation.

In order to show an example of the basic operation of the optical coupling device, the result obtained by performing a simulation by use of a 3-dimensional beam propagation method is shown in FIG. 4. In this simulation, the state in which light waves (the input spot diameter is 3 μm) made incident on the head of an array of the waveguide 2 (an array of the waveguide 2 and four auxiliary waveguides 3 to 6) having the inverted taper 2-2 are converged and coupled from the auxiliary waveguides to the main waveguide (width 450 nm, height 250 nm) as it propagates is shown in (a) of FIG. 4 and the state in which the light intensity of the light waves is gradually increased and converged to substantially a constant value as it propagates is shown in (b) of FIG. 4. In the pattern shown in (a) of FIG. 4, the main waveguide 2 arranged along the center is set in a bright region. Further, in the pattern shown in (a) of FIG. 4, two regions are respectively drawn on both sides of the bright region set along the center and the bright regions correspond to the auxiliary waveguides 3 to 6.

As described above, it is understood that an optical coupling device that reduces or enlarges a light beam with a high reduction ratio or high enlargement ratio by means of the structure shown in FIG. 3B or FIG. 3C, can couple the light beam with high efficiency, can be easily formed small and is suitable for mass production in comparison with the optical coupling device using the single taper shown in FIG. 3A can be realized.

Various embodiments of the optical coupling device are explained below.

Embodiment 1

In an optical coupling device according to Embodiment 1, silicon dioxide (BOX layer) was formed on an SOI substrate to prepare a substrate 1. Further, a main waveguide 2 and first to fourth auxiliary waveguides 3 to 6 were each formed of silicon with the thickness of 250 nm. An upper clad layer 7 was formed of polyimide with the refractive index 1.51 and formed with the thickness 1 μm and the width 4.5 μm. The main waveguide 2 was formed with the maximum width of 450 nm, the first and second auxiliary waveguides 3, 4 were formed with the maximum width of 280 nm and the third and fourth auxiliary waveguides 3 to 4 were formed with the maximum width of 250 nm.

In the first structure according to the first embodiment 1, (1) as the taper length, the main waveguide 2 was formed with the taper length of 150 μm, all of the first to fourth auxiliary waveguides 3 to 6 were formed with the total length of 150 μm, second tapered portions 3-2 to 6-2 corresponding to the input side were formed with the taper length of 75 μm, first tapered portions 3-1 to 6-1 corresponding to the output side were formed with the taper length of 75 μm, the minimum space length between the respective tapers was set to 400 nm and the head width of the taper was set to 200 nm.

Further, in the second structure according to the first embodiment 1, (2) as the taper length, the main waveguide 2 was formed with the taper length of 50 μm, all of the first to fourth auxiliary waveguides 3 to 6 were formed with the total length of 50 μm, second tapered portions 3-2 to 6-2 corresponding to the input side were formed with the taper length of 25 μm, first tapered portions 3-1 to 6-1 corresponding to the output side were formed with the taper length of 25 μm, the minimum space length between the respective tapers was set to 400 nm and the head width of the taper was set to 150 nm.

A light wave of TE polarization with the wavelength of 1.55 μm was used as an incident light wave and a light wave with the spot diameter of 3 μm was input to the input end on the light introduction region 8 side via a spherical-end taper•fiber. As a result, in each of the first structure and second structure, it was output with high-efficiency coupling with the coupling loss of 1 dB or less and 80% or more to a silicon fine-line waveguide having the cross section of 450 nm×250 nm connected to the light emission port 2A of the linear portion 2-1.

Embodiment 2

In an optical coupling device according to Embodiment 2, silicon dioxide (BOX layer) was formed on an SOI substrate to prepare a substrate 1. Further, a main waveguide 2 and first to fourth auxiliary waveguides 3 to 6 were each formed of silicon with the thickness of 250 nm. An upper clad layer 7 was formed of polyimide with the refractive index 1.51 and with the thickness 1 μm and the width 4.5 μm. The main waveguide 2 was formed with the maximum width of 450 nm, the first and second auxiliary waveguides 3, 4 were formed with the maximum width of 350 nm and the third and fourth auxiliary waveguides 3 to 4 were formed with the maximum width of 250 nm.

The main waveguide 2 was formed with the taper length of 150 μm, all of the first to fourth auxiliary waveguides 3 to 6 were formed with the total length of 300 μm, further, second tapered portions 3-2 to 6-2 corresponding to the input side were formed with the taper length of 150 μm, first tapered portions 3-1 to 6-1 corresponding to the output side were formed with the taper length of 150 μm, the minimum space length between the respective tapers was set to 400 nm and the head width of the taper was set to 200 nm.

A light wave of TE polarization with the wavelength of 1.55 μm was used as an incident light wave and a light wave with the spot diameter of 3 μm was input to the input end on the light introduction region 8 side via a spherical-end taper•fiber. As a result, also, in the structure according to the second embodiment, it was output with high-efficiency coupling with the coupling loss of 1 dB or less and 80% or more to a silicon fine-line waveguide having the cross section of 450 nm×250 nm connected to the light emission port 2A of the linear portion 2-1.

Embodiment 3

Figure 5:
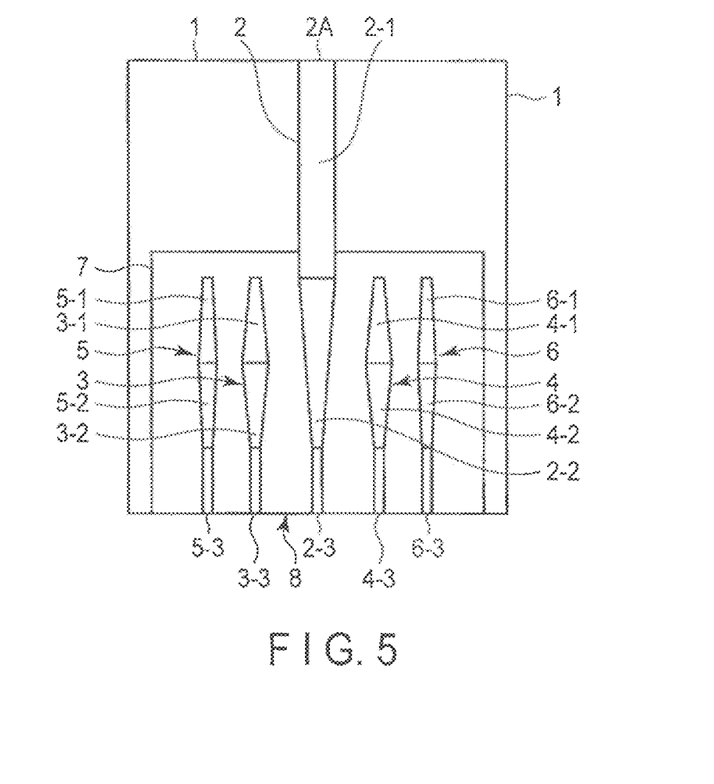
FIG. 5 is a plan view showing the structure of an optical coupling device according to a third embodiment.

In an optical coupling device according to a third embodiment, the optical coupling device with the same structure as the second structure of the first embodiment and, as shown in FIG. 5, extremely fine propagation lines 2-3, 3-3, 4-3, 5-3, 6-3 of silicon with the same width 150 nm as the head width 150 nm were formed on the heads of the tapered portion 2-2 of the main waveguide 2 and the tapers 3-2 to 6-2 on the light input side of the auxiliary waveguides 3 to 6 to extend to the light incident end side 8 of the upper clad layer 7 and the end faces of the extremely fine lines 2-3, 3-3, 4-3, 5-3, 6-3 were exposed to the light incident end side 8.

An output light wave (a light wave having a near field of the width 4 μm and the height 0.5 μm with TE polarization) from the end face of a semiconductor laser with the wavelength of 1.55 μm was input as incident light. As a result, it was output with high-efficiency coupling with the coupling loss of 1 dB or less and 80% or more to the silicon fine-line waveguide having the cross section of 450 nm×250 nm connected to the light emission port 2A of the linear portion 2-1.

In the structure shown in FIG. 5, optical coupling with higher efficiency can be achieved by applying the same to a case wherein the beam shape is flat in the vertical direction in the near field and the spread angle is large like an output of an end-face light-emission semiconductor laser. As shown in FIG. 5, if extremely fine-line arrays 2-3 to 6-3 are continuously formed from the light incident end-face side 8 to the heads of the inverted tapers 2-2 to 6-2, the light wave propagating in the clad layer 7 can be suppressed from being spread in the vertical direction and, as a result, optical coupling of higher efficiency can be achieved.

In the above embodiment, an application example as the light input portion is described, but light can be coupled with high efficiency when an output of the fine-line waveguide is coupled with the optical fiber by forming the same structure on the light output portion.

As described above, according to the various embodiments, it is confirmed that a small-sized optical coupling device can be obtained that can be easily formed, reduce or enlarge a light beam with a high reduction ratio or high enlargement ratio and couple the light beam with high efficiency and is suitable for mass production.

Next, an optical coupling-branching device according to an embodiment is explained with reference to FIG. 6 to FIG. 9.

Figure 6:
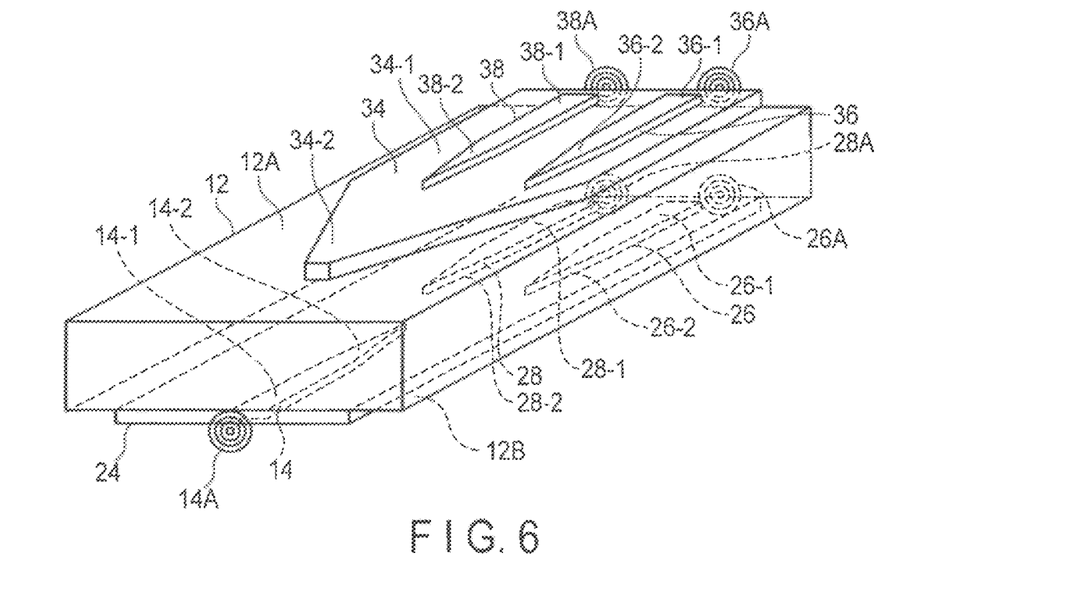
FIG. 6 is a plan view showing the structure of an optical coupling-branching device according to one embodiment.

FIG. 6 shows the see-through structure of an optical coupling-branching device according to one embodiment.

As shown in FIG. 6, the optical coupling-branching device includes an intermediate clad layer 12 having a flat top surface 12A and undersurface 12B. The undersurface 12B of the intermediate clad layer 12 is divided into a region on the light-wave input side and a region on the light-wave output side. An input-side waveguide 14 extends in the lengthwise direction of the intermediate clad layer 12 on the light-wave input side region of the undersurface 12B. The input-side waveguide 14 has a light introduction port 14A on the end face and the light introduction port 14A is lined up with the side surface of the intermediate clad layer 12. The input-side waveguide 14 includes a linear potion 14-1 formed in a flat strip form and linearly extending from the light introduction port 14A and a tapered portion 14-2 that is connected to the linear portion 14-1 and whose width is gradually reduced in the extending direction. The head of the tapered portion 14-2 is formed on a flat end face from which a light wave is emitted.

Further, first and second output-side waveguides 26, 28 extend in the lengthwise direction of the intermediate clad layer 12 on the light-wave output-side region of the undersurface 12B of the intermediate clad layer 12. The first and second output-side waveguides 26, 28 respectively include light emission ports 26A, 28A an optically coupled with other optical components, for example, optical fibers. Also, the first and second output-side waveguides 26, 28 include linear potions 26-1, 28-1 formed in a flat strip form and linearly extending from the light emission ports 26A, 28A and tapered portions 26-2, 28-2 that are connected to the linear portions 26-1, 28-1 and whose widths are gradually reduced along the extending direction. The heads of the tapered portions 26-2, 28-2 are also formed on flat end faces that guide light waves. The input-side waveguide 14, first and second output-side waveguides 26, 28 and a surrounding region thereof on the undersurface 12B of the intermediate clad layer 12 are covered with a lower clad layer 24. On the undersurface 12B of the intermediate clad layer 12, the head end face of the tapered portion 14-2 is directed to a portion between the head end faces of the tapered portions 26-2, 28-2 and a light wave propagating from the tapered portion 14-2 and the head thereof travels in the lower clad layer 24, reaches a portion between the head end faces of the tapered portions 26-2, 28-2, gradually penetrates into the tapered portions 26-2, 28-2 and is introduced into another optical member, for example, optical fiber from the light emission ports 26A, 28A.

Also, the top surface 12A of the intermediate clad layer 12 is divided into a region on the light-wave input side and a region on the light-wave output side. Third and fourth output-side waveguides 36, 38 extend in the lengthwise direction of the intermediate clad layer 12 in the region on the light-wave output side of the top surface 12A of the intermediate clad layer 12. The third and fourth output-side waveguides 36, 38 also include light emission ports 36A, 38A An optically coupled with other optical components, for example, optical fibers. The first and second output-side waveguides 36, 38 also include linear portions 36-1, 38-1 formed in a flat strip form and linearly extending from the light emission ports 36A, 38A and tapered portions 36-2, 38-2 that are connected to the linear portions 36-1, 38-1 and whose widths are gradually reduced in the extending direction. The heads of the tapered portions 36-2, 38-2 are also formed on flat end faces that guide light waves. The third and fourth output-side waveguides 36, 38 and a surrounding region thereof on the undersurface 12A of the intermediate clad layer 12 are covered with an upper clad layer 34. The upper clad layer 34 includes a rectangular region 34-1 that covers the linear portions 36-1, 38-1 and tapered portions 36-2, 38-2 and a tapered region 34-2 whose width is gradually reduced in an extending direction from the rectangular region and the tapered region 34-2 extends to face the tapered portion 14-2 of the input-side waveguide 14 via the intermediate clad layer 12.

In this case, the refractive index n12 of the intermediate clad layer 12 is set smaller than the refractive indices n24, n34 of the lower clad layer 24 and upper clad layer 34. (n12<n24, n34) Then, the refractive indices n24, n34 of the lower clad layer 24 and upper clad layer 34 are set smaller than the refractive indices n14 of the waveguides 14, 26, 28, 36, 38 to permit light waves to be guided in the waveguides 14, 26, 28, 36, 38. (n24, n34<n14)

In the above plane projection arrangement on the top surface 12B of the intermediate clad layer 12, the head end face of the tapered portion 14-2 is set to face a portion between the head end faces of the tapered portions 36-2, 38-2 via the intermediate clad layer 12. In other words, in such a plane arrangement in which the tapered portions 36-2, 38-2 are projected on the top surface 12B of the intermediate clad layer 12, the tapered portions 36-2, 38-2 are arranged on the top surface 12B and the tapered portion 14-2 is arranged on the undersurface 12A to cause the head end face of the tapered portion 14-2 to face a portion between the head end faces of the tapered portions 36-2, 38-2 via the intermediate clad layer 12. Therefore, a light wave propagating from the tapered portion 14-2 and the head thereof travels in the intermediate clad layer 12 to reach a portion between the head end faces of the tapered portions 36-2, 38-2, gradually penetrates into the tapered portions 36-2, 38-2 and is introduced into another optical member, for example, an optical fiber from the light emission ports 36A, 38A.

Figure 7:
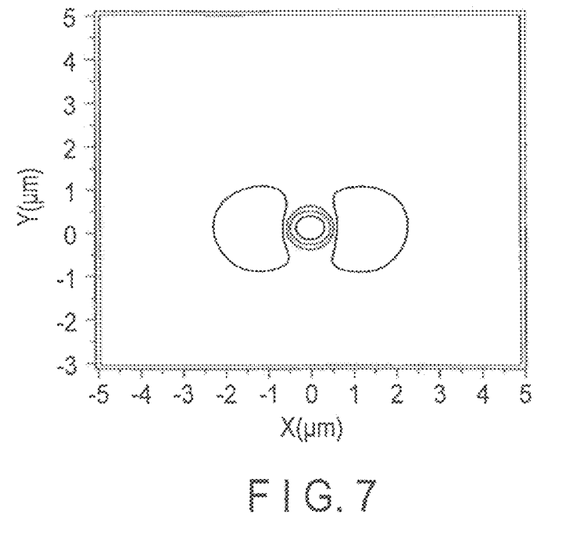
FIG. 7 is a schematic view showing the shape of a light beam before being branched and propagated to the optical coupling-branching device shown in FIG. 6.
Figure 8:
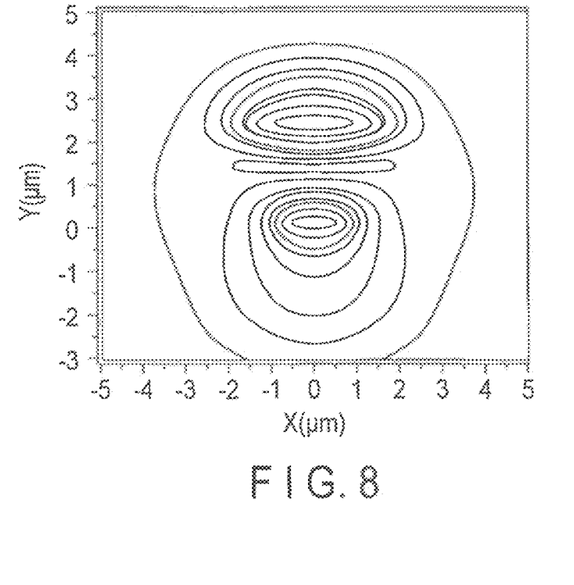
FIG. 8 is a schematic view showing the shape of a light beam in the course of branching in the optical coupling-branching device shown in FIG. 6.
Figure 9:
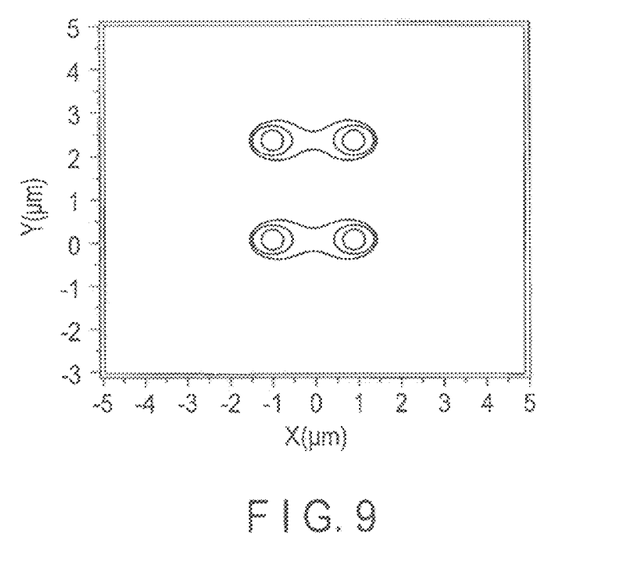
FIG. 9 is a schematic view showing the shape of a light beam after being branched in the optical coupling-branching device shown in FIG. 6.

According to the structure described above, a light wave transmitted by means of one silicon optical waveguide 14 as shown in FIG. 7 is branched into the four parallel silicon optical waveguides 26, 28, 36, 38 extending in the respective layers of the thin upper clad layer 34 and lower clad layer 24 that is several micron in width and submicron in thickness. Two groups of the silicon optical waveguides 26, 28 and silicon optical waveguides 36, 38 are separated by means of the thick clad layer 12 (intermediate clad layer 12) having a refractive index smaller than the upper clad layer 34 and lower clad layer 24. The silicon optical waveguide 14 terminates to have a taper with a narrow head at the light branching portion and light that propagates therein gradually spreads as the taper becomes narrower and is widely distributed over a whole portion of the clad layer 24 in a portion other than head portion as shown in FIG. 8. The two parallel waveguides 26, 28 having the inverted tapers 26-2, 28-2 are set to face the waveguide 14 via the tapers 26-2, 28-2 in the clad layer 24. Therefore, the propagation light wave that once spreads in the clad layer 24 as shown in FIG. 8 is branched into the two waveguide 26 and waveguide 28 via the inverted tapers 26-2, 28-2 as shown in FIG. 9 and then coupled. In the optical coupling, the range and rate in which the light wave can be picked up can be increased in a case where it is optically coupled to the two waveguide 26 and waveguide 28 in comparison with a case where it is coupled to only one waveguide. As a result, the optical coupling efficiency in the coupling with respect to the two waveguide 26 and waveguide 28 is more increased as a whole. Further, if an attempt is made to achieve the same coupling efficiency by one waveguide and by two waveguides, the coupling efficiency can be realized with shorter taper length in a device having two waveguides in comparison with a device having one waveguide. Next, further, if a light wave is simultaneously distributed to the waveguides 36, 38 arranged above the silicon optical waveguide 14, the thin upper clad layer 34 on the upper side is formed in an inversed taper form whose head width is reduced and the head portion thereof is arranged to overlap directly above the taper 14-2 of the waveguide 14 in the cross direction. When viewed from above the top surface of the device, a portion of the light wave leaking from the taper 14-2 of the waveguide 14 is branched via the taper to the clad layer 34 and coupled if the tapered portion 34-2 of the upper clad layer 34 is arranged in a relationship that it overlaps on the taper 14-2 of the waveguide 14. Further, if the two parallel inversely tapered waveguides 36, 38 covered with the upper clad layer 34 are arranged to face the waveguide 14, the propagation light that is once coupled with the upper clad layer 34 is further branched to the two waveguides 36, 38 via the tapers and coupled. Finally, output light of the waveguide 14 can be equally distributed and branched to the waveguides 26, 28, 36, 38 by adequately arranging the tapered clad layer 34 and tapered waveguides 36, 38.

The light wave branching method in the structure shown in FIG. 6 is advantageous in that three-dimensional branching that is difficult in a method for directly branching a waveguide or a branching device based on multi-mode interference can be made possible and it is not required to achieve extremely precise alignment in the arrangement of a tapered waveguide to expand the light beam in a range of several microns in the vertical direction. Further, since the light wave is coupled to the array of the plurality of waveguides 26, 28, 36, 38, the coupling efficiency can be more increased as the number of branching destinations is increased if the device length is kept constant and the device length can be reduced and it can be formed small if the coupling efficiency is kept constant. Further, it is advantageous in that it is unnecessary to form a large-scale three-dimensional structure and inclined structure when forming the structure shown in FIG. 6 and it can be relatively easily realized by processing a plane device and stacking them.

As described above, the structure of the embodiment can be easily formed in a simple form in comparison with the conventional structure that utilizes the three-dimensional interconnection or multi-mode interference device or the like based on the branching structure of the continuous optical waveguides, can be extremely reduced in size in comparison with a case wherein a conversion of optical paths is made between the optical interconnection layers by means of a single pair of inverted tapers and an optical coupling-branching device that is highly efficient, can be easily formed small and can three-dimensionally branch and couple light beams can be realized.

An embodiment of the optical coupling-branching device shown in FIG. 6 is explained below.

Embodiment 4

In the structure shown in FIG. 6, a waveguide 14 on the input side and waveguides 26, 28, 36, 38 on the output side are each formed of silicon with the width of 450 nm and the height of 250 nm, a lower clad layer 24 and tapered upper clad layer 34 are formed of nitrogen oxide silicon (refractive index 1.7) with the thickness of 250 nm and the width of 3.5 μm and an intermediate clad layer 2 is formed of silicon dioxide with the thickness of 2 μm. A tapered portion 34-2 of the upper clad layer 34 is formed with the head width of 500 nm and the taper length of 170 μm and the position of the head of the tapered portion 34-2 is arranged to be set directly above the intermediate region (90 μm from the head) of a taper 14-2 (the length is 250 μm) of the waveguide 14. The heads of tapers (the lengths thereof are each 120 μm) of the waveguides 26, 28, 36, 38 are arranged to be set on the same imaginary plane on which the light propagation directions coincide with one another and that intersects at right angles to the extending direction of the waveguides 26, 28, 36, 38 and the distance between the imaginary plane and the head of the taper 14-2 of the waveguide 14 is set to 80 μm.

The light wave propagating through the waveguides 26, 28, 36, 38 was set to a light wave of TE polarization with the wavelength of 1.55 μm. 45% of the light wave output from the head of the taper of the waveguide 1 in the above arrangement was coupled to the upper-stage waveguides 36, 38 via the inverted taper portion 34-2 of the upper clad 34 and further 45% thereof was coupled to the lower-stage waveguides 26, 28 via the lower clad layer 24. As a result, an output from one waveguide 14 could be branched into four portions by equally distributing light with the coupling efficiency (the coupling loss of 0.5 dB or less) of 90% to the four silicon fine-line waveguides 26, 28, 36, 38 having the cross section of 450 nm×250 nm and three-dimensionally arranged.

In the structure in which one input waveguide is set to face one output waveguide, for example, the taper length of 250 μm was required in order to achieve the coupling efficiency of 90% in optical path conversion from the lower stage to the upper stage, but in the structure of the embodiment, the equivalent high coupling efficiency could be obtained with approximately half the taper length in the case of four branching and the size of the device could be extremely reduced.

In the above examples, only the application examples of light branching are described, but the structure of FIG. 6 utilizes reversibility with respect to the traveling path of light waves and configures an optical branching device and optical coupling device. In the structure shown in FIG. 6, if a light wave propagates in a reverse direction, light can be similarly coupled with high efficiency in optical coupling for coupling output light waves from the four waveguides 26, 28, 36, 38 to one waveguide 14. From this viewpoint, in the explanation made with reference to FIG. 6, the output ports 26A, 28A, 36A, 38A may be reread as input ports and the input port 14A may be reread as an output port and the explanation for transmission of a light wave to permit light waves to travel from the input ports 26A, 28A, 36A, 38A to the output port 14A may be reread. That is, light waves wave-guided from the input ports 26A, 28A, 36A, 38A to the waveguides 26, 28, 36, 38 on the input side penetrate into the intermediate clad layer 12 in the tapered portions 26-2, 28-2, 36-2, 38-2, propagate in the intermediate clad layer 12 and are guided to the tapered portion 14-2 of the waveguide 14 on the output side. The light wave propagating in the intermediate clad layer 12 gradually penetrates into the tapered portion 14-2 and is coupled to the waveguide 14. Therefore, the light wave is output from the output port 14A.

In the optical coupling device according to the embodiment, an array structure of tapered waveguides is configured by arranging a plurality of auxiliary waveguides having both ends terminated in a tapered form in regions on both sides of the main waveguide having an inverted taper at one end. Therefore, it can reduce or enlarge a light beam with a high reduction ratio or high enlargement ratio, can couple the light beam with high efficiency and can be formed with small size. Therefore, it is possible to realize an optical coupling device that can converge an optical signal to light density by means of a fine-line optical waveguide and achieve practical use and mass production of an optical interconnection and optical device that can be integrated with high density.

Further, in the optical coupling-branching device according to another embodiment, a clad layer having an inverted taper is combined with an array of a plurality of inversely tapered waveguides arranged in a plurality of clad layers to branch and distribute an output of one waveguide to a plurality of waveguides or conversely couple outputs of a plurality of waveguides to one waveguide.

With the above structure, light distribution can be made over different optical interconnection layers that can be easily formed with high efficiency and small size. As a result, an optical coupling-branching device that can achieve an optical interconnection free from a loss and crosstalk at the intersection can be realized.

Accordingly, there is provide an optical coupling device and optical coupling-branching device that can converge an optical signal to light density by means of a fine-line optical waveguide and achieve practical use and mass production of an optical interconnection and optical device that can be integrated with high density are provided.

As described above, according to this embodiment, there is provided an optical coupling-branching device that can achieve practical use and mass production of an optical interconnection and optical device that utilizes high-density integration and an increase in light density by means of a fine-line optical waveguide.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical coupling device comprising:
a first clad layer having a first surface;
a main waveguide having a strip form and including a linearly extending portion and a tapered portion, which is formed on the first surface to extend along a waveguiding direction of a light wave, wherein the linearly extending portion has an emission port at one end of an emission side from which the light wave is emitted, and the tapered portion has one and other ends, the one end being connected to the other end of the linearly extending portion, the tapered portion has a first width which is gradually reduced towards the other end corresponding to an incident side of the light wave;

a plurality of auxiliary waveguides which are formed on the first surface to extend along the wave-guiding direction of the light wave and are arranged in substantially parallel on the both sides of the main waveguide, wherein each of the auxiliary waveguides has first and second tapered portions which are coupled to each other at a coupling side, and the auxiliary waveguides have second widths which are gradually reduced towards the incident side of light wave and the emission side of light wave, from the coupling side, respectively; and a second clad layer which is so formed as to cover the main waveguide, auxiliary waveguides and first clad layer, wherein the first clad layer guides the light wave introduced into the first clad layer or the second clad layer and gradually converge the light wave towards the main waveguide.

2. The optical coupling device according to claim 1, wherein the first width of the main waveguide is gradually decreased from a first maximum width, the second width of the auxiliary waveguide is gradually decreased from a second maximum width which is smaller than the first maximum width.

3. The optical coupling device according to claim 2, wherein the plurality of auxiliary waveguides are arranged along a array direction normal to the wave-guiding direction and the second maximum widths of the auxiliary waveguides becomes smaller as it is more separated apart from the main waveguide along the array direction.

4. The optical coupling device according to claim 1, wherein the second clad layer has a second refractive index larger than a first refractive index of the first clad layer.

5. The optical coupling device according to claim 1, wherein the main waveguide and auxiliary waveguide each further include a head of a tapered portion on the light wave incident side and a fine propagation line with constant width connected to the head and extending to the light wave incident side.

6. The optical coupling device according to claim 1, wherein the main optical waveguide and auxiliary optical waveguide are formed of silicon, the first clad layer is formed of silicon dioxide and the second clad layer is formed of nitrogen oxide silicon or polymer.

7. An optical coupling-branching device comprising:
a first clad layer having a first surface and a second surface that faces the first surface;
a first waveguide extending on the first surface along a wave-guiding direction of a light wave from a light wave incident side towards a light wave emission side and including a first tapered portion that has a first head portion, the first waveguide having the first tapered portion whose lateral width is gradually reduced towards the emission side;
second and third waveguides arranged in parallel, extending on the first surface along the wave-guiding direction of the light wave and including second and third tapered portions, the second and third tapered portions having second and third head portions, the second and third waveguides having the second and third tapered portions whose lateral widths are gradually reduced towards the incident side, and the second and third head portions being separately arranged with a distance and the first head portion being directed towards a portion between the second and third head portions;

a second clad layer which is so formed as to cover the first, second and third waveguides and the first surface, the second clad layer coupling the light wave wave-guided to the first waveguide from the incident side to the second and third waveguides to branch the same to the second and third waveguides;

fourth and fifth waveguides arranged in parallel, extending on the second surface along the wave-guiding direction of the light wave and including fourth and fifth tapered portions having fourth and fifth head portions, the fourth and fifth waveguides including the fourth and fifth tapered portions whose lateral widths are gradually reduced towards the incident side and that are arranged to permit the light wave propagating and penetrating in the first clad layer from the first tapered portion and first head portion to be directed to a portion between the fourth and fifth head portions; and a third clad layer that covers the fourth and fifth waveguides and the second surface, the third waveguide coupling the light wave wave-guided to the first waveguide from the incident side to the fourth and fifth waveguides to branch the same to the fourth and fifth waveguides.

8. The optical coupling-branching device according to claim 7, wherein the first clad layer has a refractive index smaller than refractive indices of the second and third clad layers.

9. The optical coupling-branching device according to claim 7, wherein the first, second and third optical waveguides are formed of silicon, the second and third clad layers are formed of nitrogen oxide silicon or polymer and the first clad layer is formed of silicon dioxide.

10. The optical coupling-branching device according to claim 7, wherein the first, second, third, fourth and fifth optical waveguides are formed of silicon, the second and third clad layers are formed of nitrogen oxide silicon or polymer and the first clad layer is formed of silicon dioxide.

11. An optical coupling-branching device comprising:
a first clad layer having a first surface and a second surface that faces the first surface;
a first waveguide extending on the first surface along a wave-guiding direction of a light wave guided from emission of the light wave towards an incident side of the light wave and including a first tapered portion that has a first head portion, the first waveguide including the first tapered portion whose lateral width is gradually reduced towards the incident side;
second and third waveguides arranged in parallel, extending on the first surface along the wave-guiding direction of the light wave and including second and third tapered portions that have second and third head portions, the second and third waveguides including the second and third tapered portions whose lateral widths are gradually reduced towards the emission side and that have the second and third head portions separately arranged with a distance and the first head portion being directed towards a portion between the second and third head portions;
a second clad layer formed to cover the first, second and third waveguides and the first surface, the second clad layer coupling light waves wave-guided to the second and third waveguides from the incident side to the first waveguide to couple the same to the first waveguide;
fourth and fifth waveguides arranged in parallel, extending on the second surface along the wave-guiding direction of the light wave and including fourth and fifth tapered portions that have fourth and fifth head portions, the fourth and fifth waveguides including the fourth and fifth tapered portions whose lateral widths are gradually reduced towards the emission side and that are arranged to permit the light wave propagating and penetrating in the first clad layer from the fourth and fifth tapered portions and fourth and fifth head portions to be directed to the first head portion; and a third clad layer that covers the fourth and fifth waveguides and the second surface, the third waveguide coupling the light wave wave-guided from the incident side to the fourth and fifth waveguides to the first waveguide to couple the same to the first waveguide.

* * * * *